United States Patent
Matsukura

(10) Patent No.: US 10,048,678 B2
(45) Date of Patent: Aug. 14, 2018

(54) NUMERICAL CONTROLLER

(71) Applicant: FANUC Corporation, Minamitsuru-gun, Yamanashi (JP)

(72) Inventor: Sadao Matsukura, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 186 days.

(21) Appl. No.: 14/972,742

(22) Filed: Dec. 17, 2015

(65) Prior Publication Data

US 2016/0179088 A1   Jun. 23, 2016

(30) Foreign Application Priority Data

Dec. 18, 2014  (JP) .................................. 2014-255986

(51) Int. Cl.
G05B 19/408 (2006.01)
G05B 19/4155 (2006.01)
G06F 11/36 (2006.01)

(52) U.S. Cl.
CPC ....... G05B 19/4155 (2013.01); G05B 19/408 (2013.01); G06F 11/3636 (2013.01);
(Continued)

(58) Field of Classification Search
CPC .............. G05B 19/4155; G05B 19/408; G05B 2219/35263; G05B 2219/35259;
(Continued)

(56) References Cited

U.S. PATENT DOCUMENTS

| 2005/0160410 A1* | 7/2005 | Narisawa .................. G06F 8/24 717/141 |
| 2013/0178974 A1* | 7/2013 | Kudou ............... G05B 19/4155 700/174 |

(Continued)

FOREIGN PATENT DOCUMENTS

| CN | 103907067 A | 7/2014 |
| EP | 0092377 A2 | 10/1983 |

(Continued)

OTHER PUBLICATIONS

Decision to Grant a Patent dated Mar. 7, 2017 in Japanese Patent Application No. 2014-255986 (3 pages) with an English translation (3 pages).

(Continued)

*Primary Examiner* — Kenneth M Lo
*Assistant Examiner* — Michael W Choi
(74) *Attorney, Agent, or Firm* — Drinker Biddle & Reath LLP

(57) ABSTRACT

A numerical controller for controlling a machine tool for machining a work on the basis of an NC program for execution including a variable includes NC program reading unit, NC program analyzing unit, and a variable value table sequentially holding a variable value assigned to a variable at time of execution of a predetermined unit of program read by the NC program reading unit, and the NC program analyzing unit includes a character string for variable-check creating unit for replacing a character string included in an instruction affected by the variable in the predetermined unit of program with a character string for variable-check on the basis of the predetermined unit of the program read by the NC program reading unit and the variable value obtained from the variable value table and an NC program for variable-check writing unit.

4 Claims, 5 Drawing Sheets

(52) U.S. Cl.
CPC ............. *G05B 2219/35263* (2013.01); *G05B 2219/35563* (2013.01)

(58) Field of Classification Search
CPC ....... G05B 2219/42315; G06F 11/3636; G06F 11/3644; G06F 8/443–8/4443
USPC ........................................................ 700/174
See application file for complete search history.

(56) References Cited

U.S. PATENT DOCUMENTS

2014/0121839 A1     5/2014  Hanya et al.
2014/0344569 A1*   11/2014  Li .......................... G06F 21/128
                                                                    713/164
2015/0205285 A1*    7/2015  Hiruma .................. G05B 19/19
                                                                    700/159

FOREIGN PATENT DOCUMENTS

| JP | S58-181108 A | 10/1983 |
| --- | --- | --- |
| JP | S64-91208 A | 4/1989 |
| JP | 1-91208 U | 6/1989 |
| JP | H05-108130 A | 4/1993 |
| JP | H10-328976 A | 12/1998 |

OTHER PUBLICATIONS

Chinese Office Action dated Jan. 30, 2018 with attached English-language translation.

\* cited by examiner

NC PROGRAM FOR EXECUTION

CHARACTER STRING FOR VARIABLE-CHECK

NC PROGRAM FOR EXECUTION

CHARACTER STRING FOR VARIABLE-CHECK

NUMERICAL CONTROLLER

RELATED APPLICATION DATA

This application claims priority under 35 U.S.C. § 119 and/or § 365 to Japanese Application No. 2014-255986 filed Dec. 18, 2014, the entire contents is incorporated herein by reference.

BACKGROUND OF THE INVENTION

1. Field of the Invention

The present invention relates to a numerical controller and particularly to a numerical control device capable of easily checking a variable value used in an NC program during machining even after the machining.

2. Description of the Related Art

An NC program executed by a numerical controller can directly instruct a moving amount of an axis or a constant used in an conditional expression such as an IF statement. Besides such direct instructing method, a variable instead of the constant can be designated so that the variable value corresponding to the variable is indirectly instructed. When the numerical controller reads out an instruction by a variable during execution of the NC program, it reads out the variable value corresponding to the variable from a storage medium (non-volatile memory, HDD and the like) in the numerical controller and uses the value. Such variables and the variable values corresponding to them can be stored in plural in the numerical controller. The present invention relates to the NC program using the variable.

The variable values corresponding to the variables used in the NC program are usually stored in the storage medium of the numerical controller before the NC program is executed. For example, an operator stores them in the storage medium by operating a display/input device of the numerical controller or stores them in the storage medium from an external device connected using a communication function of the numerical controller. In the description of the present application, the term "operator" refers to a person who operates a machine tool with the numerical controller and the operator performs creation of the NC program, an input work of values required for execution of the NC program into the numerical controller, execution instruction of the NC program to the numerical controller and the like.

Moreover, instead of storing the variable values in the storage medium of the numerical controller before execution of the NC program, the variable values can be stored during execution of the NC program. For example, by temporarily stopping execution of the NC program by an instruction of the operator or a signal from outside, the variable value can be stored in the storage medium by the aforementioned method during that period. Moreover, since the NC program has instructions ready for setting the variable values to the variables, the variable values used in the NC program can be also stored in the storage medium of the numerical controller during execution of the NC program.

Japanese Patent Laid-Open No. 10-328976 discloses a prior-art technology for storing an execution situation of the NC program of the numerical controller as operation information.

In the NC program used for machining in the numerical controller, variables for which the variable values are determined in accordance with a state of the numerical controller in execution are used such as custom macro variables and setting numbers of a tool-length correction amount table. These variable values for the variables are changed after the NC program is executed in some cases.

For example, a variable value is changed for improving a machining quality after the execution of the NC program and the NC program might be executed again. Moreover, in order to use the variable used in the NC program for another purpose in another NC program, the variable value might be changed. Furthermore, since an instruction for changing the variable value during execution can be described in the NC program, even if the same variable is used at a plurality of places in one NC program, the variable values might be different from each other in each use.

In the NC program using the variable as above, there is a problem that, if the variable value is changed after the execution of the NC program, the variable value actually used in machining cannot be known even if the operator analyzes the NC program after machining is finished.

The numerical controller described in Japanese Patent Laid-Open No. 10-328976 discloses a function of storing the operation information in the numerical controller, and the used variable values can be stored in the operation information, but in order to check the variable value used during machining, the operation information and the NC program need to be compared with each other, and it is difficult for the operator to check the used variable value for each block of the NC program.

SUMMARY OF THE INVENTION

An object of the present invention is to provide a numerical controller capable of easily checking a variable value used in an NC program during machining even after the machining.

The numerical controller according to the present invention is for controlling a machine tool for machining a work on the basis of an NC program for execution including a variable, The numerical controller comprising an NC program for variable-check storage region for storing an NC program for variable-check indicating an execution state of the NC program for execution, NC program reading unit for sequentially reading the NC program for execution on a predetermined unit basis, NC program analyzing unit for analyzing the predetermined unit of the program read by the NC program reading unit, workpiece machining unit for controlling the machine tool on the basis of a result of analysis by the NC program analyzing unit, and a variable value table sequentially holding a variable value assigned to the variable at time of execution of the predetermined unit of the program read by the NC program reading unit, in which the NC program analyzing unit has variable replacing unit, character string for variable-check creating unit, and NC program for variable-check writing unit, the variable replacing unit outputs, to the workpiece machining unit, a program in which the variable included in the predetermined unit of the program read by the NC program reading unit is replaced with a variable value obtained from the variable value table on the basis of the variable value and also outputs, to the character string for variable-check creating unit, the predetermined unit of the program read by the NC program reading unit and the variable value obtained from the variable value table, the character string for variable-check creating unit replaces a character string included in an instruction affected by the variable in the predetermined unit of the program with a character string for variable-check on the basis of the predetermined unit of the program read by the NC program reading unit and the variable value obtained from the variable value table input from the variable replacing unit, and the NC program for variable-check writing unit stores the replaced predetermined unit of the program in the NC program for variable-check storage region.

The NC program for variable-check can be executed by the numerical controller and is capable of work machining equal to the NC program for execution.

The character string for variable-check can include a character string indicating the variable and a character string indicating a variable value assigned to the variable.

Since the present invention creates the NC program for variable-check in which the variable value used during machining is embedded by including the configuration above, by using the NC program for variable-check also after the machining, the operator can easily check the variable used in the machining and the variable value corresponding to that.

For example, if the operator examines the NC program for improvement of a machining quality or examination of a cause of machining nonconformity, the variable value used in the machining can be easily checked. Moreover, since the NC program for variable-check created in the present invention is in a format that can be executed in the numerical controller, the operator can check the operation by executing the NC program for variable-check in the numerical controller.

BRIEF DESCRIPTION OF THE DRAWINGS

The aforementioned and other objects and features of the present invention will be made apparent from description of the following embodiments by referring to the attached drawings. In the drawings.

DETAILED DESCRIPTION OF THE PREFERRED EMBODIMENTS

Figure 1:
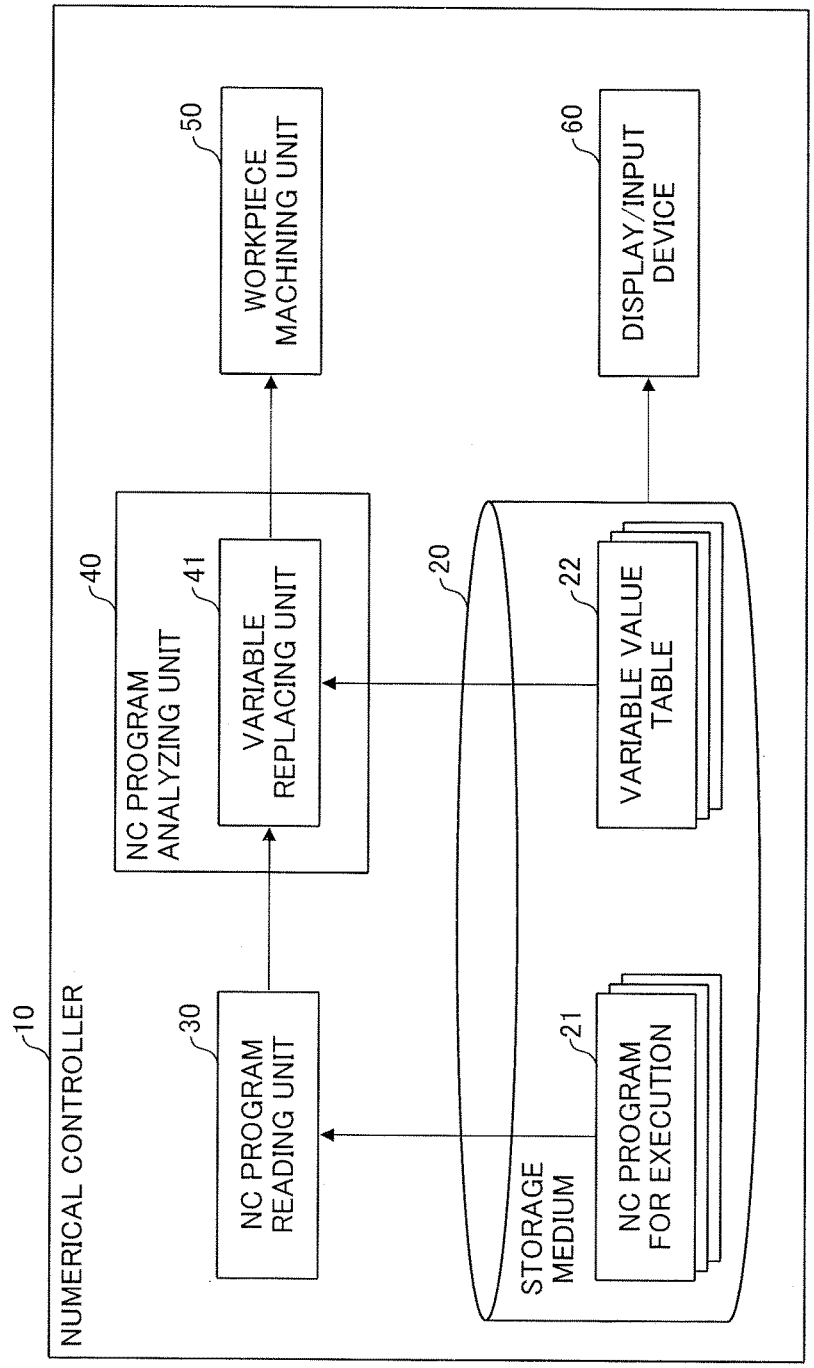
FIG. 1 is a block diagram of essential parts of a numerical controller in a prior-art technology.

An embodiment of the present invention will be described below with the attached drawings. The description will be made by using the same reference numerals for configuration equal to or similar to those of a prior-art technology.

In an NC program, in general, various variables such as a custom macro variable or a setting number of a tool-length correction amount table can be used, but in an example described in this description, an NC program using a custom macro variable will be described as an example.

First, an operation of the general numerical controller will be described on the basis of FIG. 1. In a numerical controller 10 in the prior-art technology, when an operator instructs execution of the NC program, NC program reading unit 30 in the numerical controller 10 reads one line (1 block) from an NC program for execution 21 stored in a storage medium 20 and delivers it to NC program analyzing unit 40.

The NC program analyzing unit 40 changes one line of the read-out NC program to a format not including a variable and delivers it to workpiece machining unit 50. That is, if a variable is included in the one line of the read-out NC program, the used variable is searched by variable replacing unit 41 from a variable value table 22 stored in the storage medium 20 and replaced with a variable value and then, delivered to the workpiece machining unit 50. The workpiece machining unit 50 analyzes the NC program, calculates moving amounts and speeds of a shaft and a spindle and machines a work.

As described above, the numerical controller repeats reading-out of the NC program by one line, analysis, and machining and completes machining of the work. The NC program for execution 21 and the variable value table 22 stored in the storage medium 20 can be edited by a display/input device 60.

In this type of general numerical controller, the variable in the NC program is replaced with a variable value held in the variable value table 22 in the numerical controller and then, delivered to the workpiece machining unit 50 but the variable value sent to the workpiece machining unit 50 is not left in the numerical controller. A conditional expression such as an IF statement is not sent to the workpiece machining unit 50 and the variable value used here does not remain in the numerical controller, either. Therefore, if the variable value in the variable value table 22 in the numerical controller is changed as follows, the variable value used in the machining can no longer be analyzed.

(1) If the variable value is changed during execution or after execution of the NC program by an operation of the display/input device by the operator or an instruction from an external device; or (2) If the variable value is changed during execution of the NC program by an instruction to change the variable value in the NC program in execution.

Figure 2:
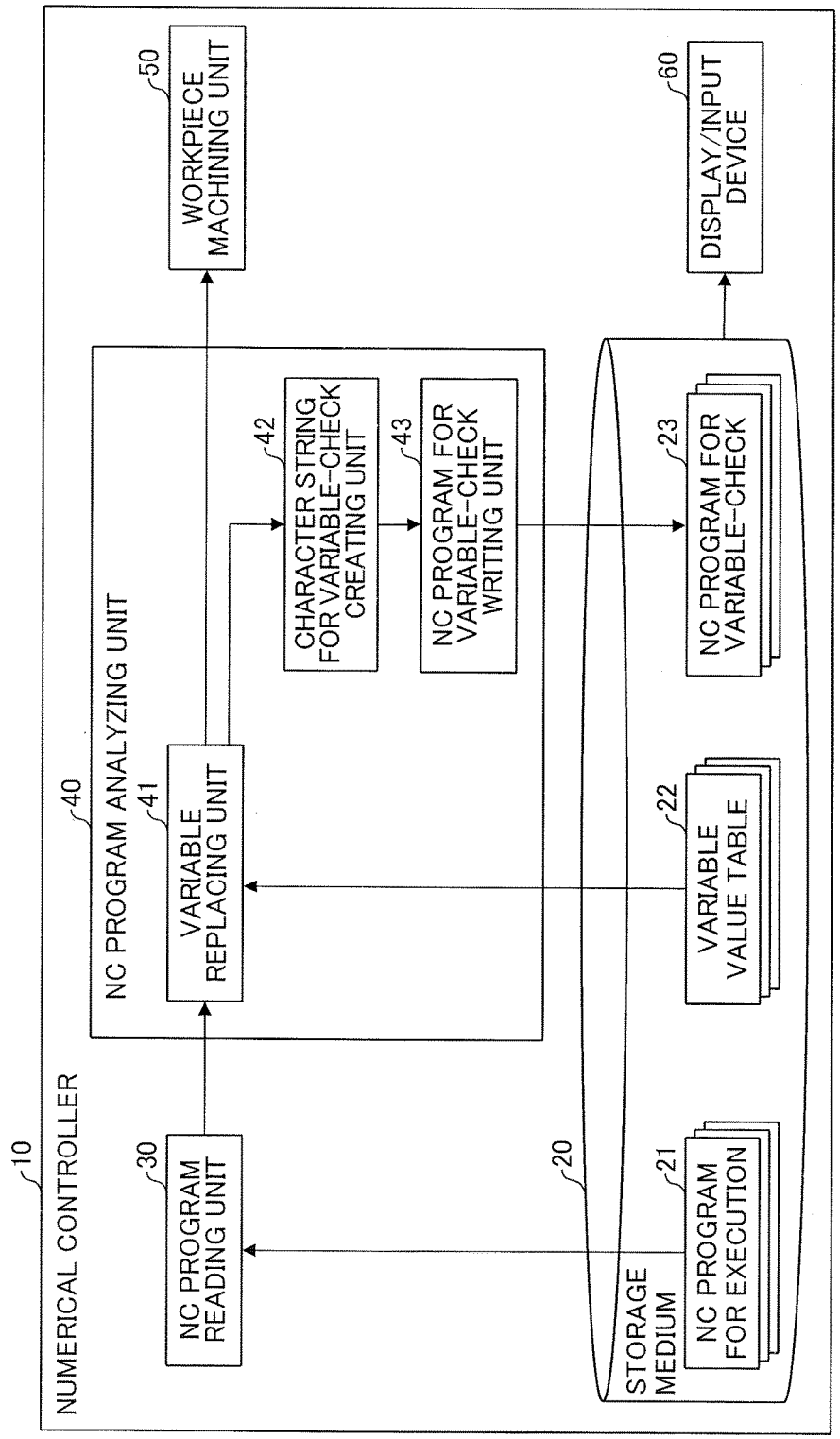
FIG. 2 is a block diagram of essential parts of a numerical controller in an embodiment of the present invention.

FIG. 2 is a functional block diagram of the numerical controller in the embodiment of the present invention. In the present invention, in addition to functional unit provided in a general numerical controller, character string for variable-check creating unit 42 and NC program for variable-check writing unit 43 are further provided, and a region for storing an NC program for variable-check 23 is provided in the storage medium 20. The NC program for variable-check 23 is created by the character string for variable-check creating unit 42 and the NC program for variable-check writing unit 43. The NC program for variable-check 23 is formed in a format that can be executed by the numerical controller. The NC program for variable-check 23 created as above can be displayed by the display/input device 60 similarly to the NC program for execution 21.

Figure 3:
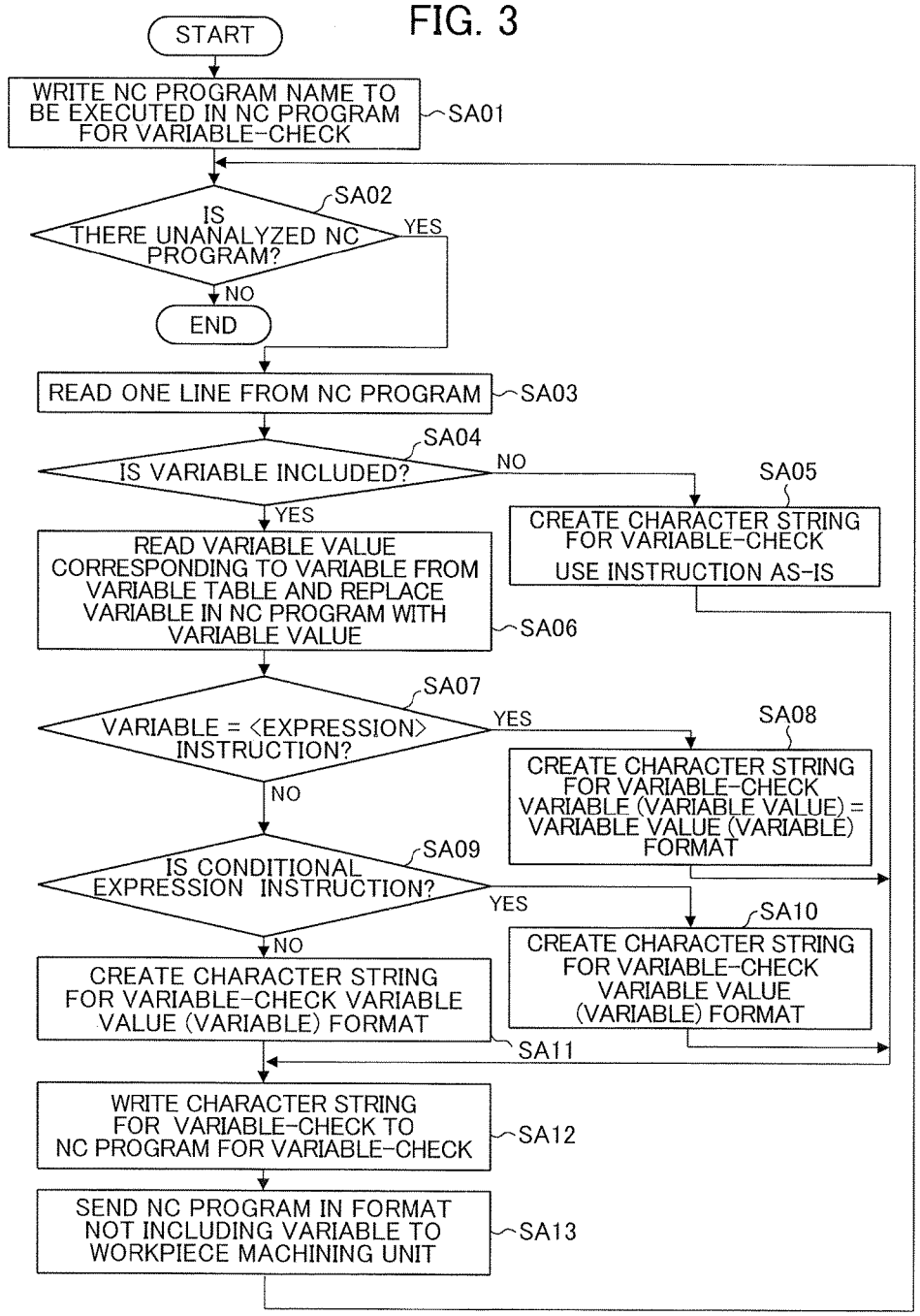
FIG. 3 is a flowchart of processing executed in the numerical controller in the embodiment of the present invention.

FIG. 3 is a flowchart illustrating a processing procedure in which the NC program analyzing unit 40 creates the NC program for variable-check 23 when the NC program uses the custom macro variable. Each processing executed on the numerical controller 10 will be described below in accordance with the flowchart in FIG. 3.

Regarding each processing in the flowchart in FIG. 3, Step SA02 and Step SA03 are executed by the NC program reading unit 30 in FIG. 2, Step SA04 and Step SA06 by the variable replacing unit 41 in FIG. 2, Step SA05 and Steps SA07 to Step SA11 by the character string for variable-check creating unit 42 in FIG. 2, and Step SA01 and Step SA12 by the NC program for variable-check writing unit 43 in FIG. 2, respectively. Step SA13 corresponds to sending of the NC program not including a variable by the NC program analyzing unit 40 to the workpiece machining unit 50.

When execution of the NC program is instructed by the operator, the NC program analyzing unit 40 creates the NC program for variable-check 23 and writes a name of the NC program for which execution is instructed (Step SA01). For a file name of this NC program for variable-check 23, a character string obtained by adding time and date of start of machining to the NC program name for which execution is instructed is used, for example. By configuring as above, even if an instruction is issued by the operator to execute the same NC program several sessions, separate NC programs for variable-check are created.

By configuring as above, if the operator executes the NC program named O1234 at 10:10:30 on Dec. 10, 2014 and 15:30:10 on Dec. 20, 2014, for example, the NC program for variable-check 23 is created separately at each execution, and the file names become O1234_20141210_101030 and O1234_20141220_153010, respectively, and they are stored without duplication of the file names.

Subsequently, the NC program reading unit 30 determines whether there is an unanalyzed program line in the NC program for execution 21 for which execution is instructed (Step SA02), and if there is an unanalyzed program line, the NC program reading unit 30 reads one line from the NC program for execution 21 (Step SA03) and outputs the read-out line to the variable replacing unit 41.

The variable replacing unit 41 analyzes the program line output from the NC program reading unit 30 and determines whether the program line includes a variable (Step SA04). If it is determined at step SA04 that the variable is included, a current variable value corresponding to the variable included in the program line is obtained by referring to the variable value table 22, a program line in which the variable included in the analyzed program line is replaced with the obtained variable value is created (Step SA06), and a format not including the variable is output to the workpiece machining unit 50 (Step SA13). Moreover, the variable replacing unit 41 outputs the replaced/created program line to the workpiece machining unit 50 and also outputs the program line output from the NC program reading unit 30, the variable included in the program line, and the variable value corresponding to the variable to the character string for variable-check creating unit 42.

In the numerical controller of the present invention, in addition to the processing of the aforementioned variable replacing unit 41, the processing of creating a character string for variable-check for one line from the variable included in the program line obtained by the character string for variable-check creating unit 42 through the variable replacing unit 41 and the variable value corresponding to the variable is executed (Step SA05 and Step SA07 to Step SA11), and the NC program for variable-check writing unit 43 adds the character string for variable-check to the NC program for variable-check 23 (Step SA12). The method of creating the character string for variable-check by the character string for variable-check creating unit 42 will be described below by using typical three types of custom macro variable instructions as an example, but the method of creating the character string for variable-check is not limited to those three types and may be changed within a design range which creates the character string for variable-check that can be easily grasped by the operator in accordance with the type of the custom macro variable instruction.

A first creating method is performed in the case of an instruction of setting a calculation result of an <expression> on a right side to a variable on a left side as in "variable=<expression>" (Step SA07). For the <expression>, any one of a constant, a variable, and a function is independently instructed or they are connected by operators such as addition (+), subtraction (−), OR and the like and instructed. In this case, a character string for variable-check is created for the left side by a calculation result of the variable and the <expression> in a comment format, while a character string for variable-check is created for the right side by a character string obtained by replacing a variable in the <expression> with a variable value thereof and a variable name in a comment format (Step SA08).

Figure 4:
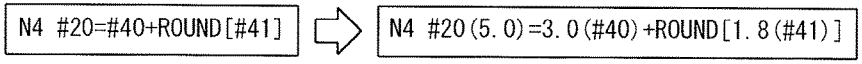
FIG. 4 is an example of a character string for variable-check created by a first creating method of the present invention.

FIG. 4 illustrates an example of the character string for variable-check created from the NC program for execution by the first creating method. In FIG. 4, a conversion example is illustrated when an instruction statement is "N4 #20=#40+ROUND[#41]", a variable value of a variable "#40" is 3.0, and a variable value of a variable "#41" is 1.8. In this case, in accordance with the aforementioned conversion rule, the variable "#20" on the left side is replaced with a character string "#20(5.0)" and an expression on the right side "#40+ROUND[#41]" is replaced with a character string "3.0 (#40)+ROUND[1.8(#41)]".

As a result, from the aforementioned instruction statement, a character string for variable-check "N4 #20(5.0) =3.0(#40)+ROUND[1.8(#41)]" is created. The ROUND[ ] function is a function of returning a result obtained by rounding an argument to the nearest whole number.

A second creating method is performed in the case of an instruction using a variable in a conditional expression (referring to a portion instructed by [ ]) such as a conditional branch instruction "IF [variable GT variable] GOTO8" (Step SA09). This conditional branch instruction is an instruction to jump to a block with a sequence number 8 if the conditional expression that the variable on the left side is larger than or equal to the variable on the right side, while not to give an influence to an operation of the NC program if the conditional expression is not satisfied. For this type of instruction, a character string for variable-check is created by a character string obtained by replacing a variable with a variable value thereof and a variable name in a comment format (Step SA10).

Figure 5:
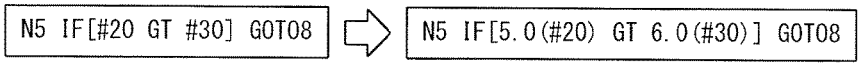
FIG. 5 is an example of the character string for variable-check created by a second creating method of the present invention.

FIG. 5 illustrates an example of the character string for variable-check created from the NC program for execution by the second creating method. In FIG. 5, a conversion example is illustrated when an instruction statement is "N5 IF[#20 GT #30] GOTO8", a variable value of the variable "#20" is 5.0, and a variable value of the variable "#30" is 6.0. In this case, in accordance with the aforementioned conversion rule, the variable "#20" on the left side of the conditional expression is replaced with a character string "5.0 (#20)" and the variable on the right side "#30" is replaced with a character string "6.0(#30)". As a result, from the aforementioned instruction statement, the character string for variable-check "N5 IF[5.0(#20) GT 6.0(#30)] GOTO8" is created.

A third creating method is performed in the case of a word instruction simply using a value of the variable such as "Y#10". In this case, a character string for variable-check is created by a character string by replacing a variable with a variable value thereof and a variable name in a comment format (Step SA11). For example, if the instruction statement is "Y#10" and a variable value of the variable "#10" is 200.0, a character string for variable-check "Y200.0 (#10)" is created from the aforementioned instruction statement.

When analysis of the one program line is finished by the first to third creating methods, regarding the character string for variable-check for one line created by the character string for variable-check creating unit 42, the character string for variable-check is added to the NC program for variable-check 23 by the NC program for variable-check writing unit 43 (Step SA12).

After that, it is determined whether or not there is an unanalyzed program line in the NC program for execution 21 for which execution is instructed again (Step SA02), and if there is the unanalyzed program line in the NC program for execution 21, one line is read from the NC program for execution 21 (Step SA03), and creation of the character string for variable-check (Step SA05 and Step SA07 to Step SA11), writing of the character string for variable-check in the NC program for variable-check (Step SA12), and machining of the work (Step SA13) are repeated. If there is no unanalyzed program line in the NC program for execution 21, execution of the NC program for execution 21 is finished.

If the NC program for execution 21 being executed calls a subprogram, the operator sets in advance whether it is written subsequently to the NC program for variable-check 23 being written or the NC program for variable-check 23 is created separately for a subprogram so that each functional unit creates the NC program for variable-check 23 in accordance with the setting.

Figure 6:
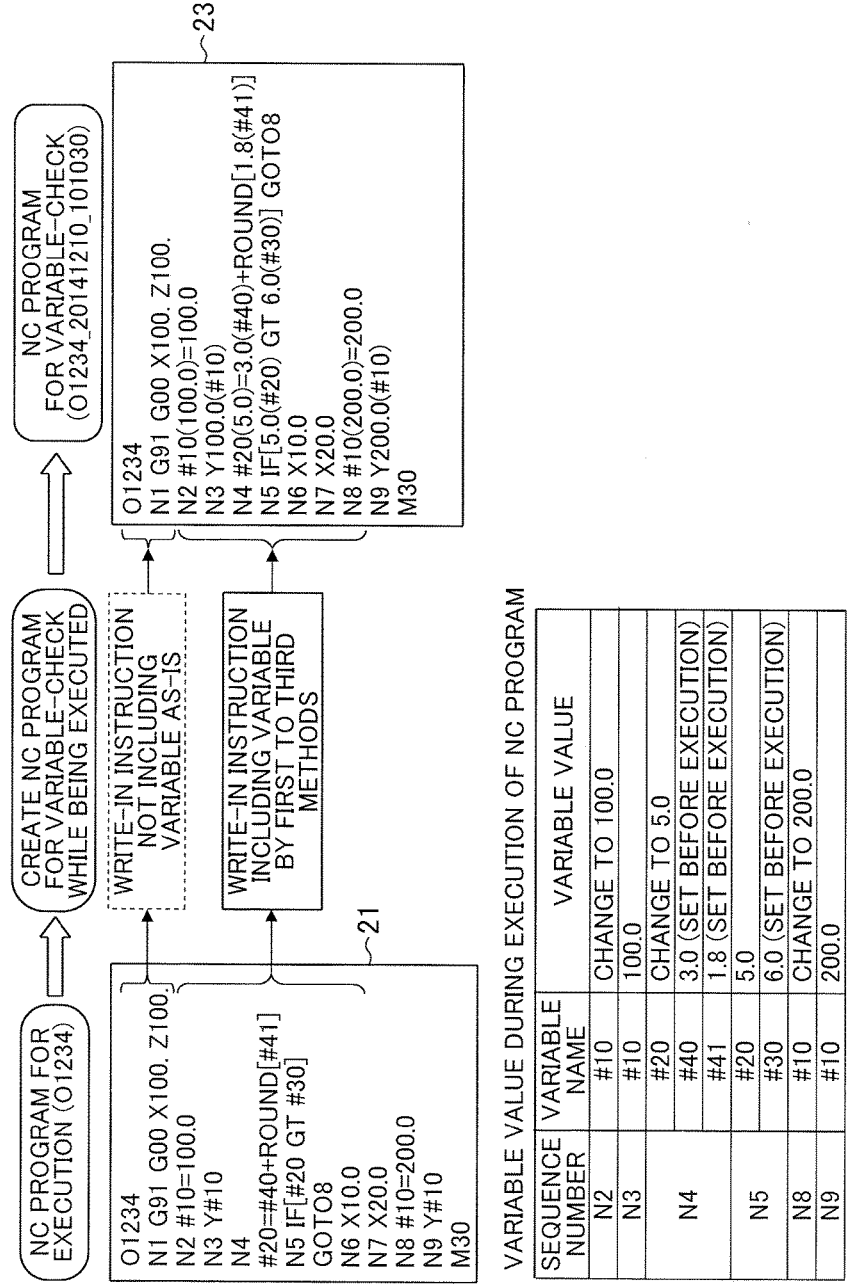
FIG. 6 is a view illustrating a creation example of an NC program for variable-check in this embodiment.

FIG. 6 is a view illustrating a creation example of the NC program for variable-check in this embodiment. When the NC program for execution 21 is executed, the NC program for variable-check 23 is created by the NC program analyzing unit 40. A table illustrated on a lower part of FIG. 6 illustrates how the variable value corresponding to the variable used in the NC program for execution 21 changes together with a sequence number of the NC program.

The variables of the sequence numbers N2, N4, N8 of the NC program being executed are written in the NC program for variable-check 23 by the aforementioned first method (Step SA07, Step SA08). Similarly, the variable of the sequence number N5 is written by the second method (Step SA09, Step SA10), and the variables of the sequence numbers N3 and N9 are written by the aforementioned third method (Step SA11), respectively, in the NC program for variable-check 23.

So far, the custom macro variable is described as an example, but the character string for variable-check creating unit 42 can be implemented so as to perform operations differently according to the type of the variable in use.

For example, with a tool-length correction function of the numerical controller, by setting disparity between a value of the tool length estimated when the NC program was created and a value of the tool length of a tool used when the NC program is executed in the tool-length correction amount table, the disparity in the values of the tool lengths can be corrected without changing the NC program. An example of an instructing method of this tool-length correction function is a method of instructing a direction in which the tool length is to be corrected by a G43 code (positive direction) or a G44 code (negative direction) and also of instructing a number set in the tool-length correction amount table by an H code.

If the instruction by such method is included in the one program line read from the NC program for execution 21, it is only necessary that the character string for variable-check creating unit 42 creates the character string for variable-check by the G43 code or the G44 code in a comment format, a moving instruction of a shaft after the tool length is corrected, and a setting number of the tool-length correction amount table in a comment format.

For example, if an instruction statement is "G43 Z100.0 H2" and a value of the setting number 2 of the tool-length correction amount table is 0.5, the moving instruction of a Z-axis becomes Z100.0+0.5=Z100.5 and thus, by creating the character string for variable-check of "(G43) Z100.5 (H2)", the operator can easily grasp the variable value of the variable used for control of the machine tool only by taking a look at the line of the NC program for variable-check.

The embodiment of the present invention has been described but the present invention is not limited to the example of the aforementioned embodiment but can be put into practice in other modes by applying appropriate changes.

For example, in the aforementioned embodiment, reading of the NC program for execution is performed by the unit of one line (one block), but the reading unit can be changed in design in accordance with a specification of the numerical controller to which the present invention is applied.

What is claimed is:

1. A numerical controller for controlling a machine tool for machining a work on the basis of an NC program for execution including a variable, comprising:
   an NC program for variable-check storage region for storing an NC program for variable-check indicating an execution situation of the NC program for execution;
   NC program reading unit for sequentially reading the NC program for execution on a predetermined unit basis;
   NC program analyzing unit for analyzing the predetermined unit of the program read by the NC program reading unit;
   workpiece machining unit for controlling the machine tool on the basis of a result of analysis by the NC program analyzing unit; and
   a variable value table sequentially holding a variable value assigned to the variable at time of execution of the predetermined unit of the program read by the NC program reading unit, wherein
   the NC program analyzing unit has variable replacing unit, character string for variable-check creating unit, and NC program for variable-check writing unit;
   the variable replacing unit outputs, to the workpiece machining unit, a program in which the variable included in the predetermined unit of the program read by the NC program reading unit is replaced with a variable value obtained from the variable value table on the basis of the variable value and also outputs, to the character string for variable-check creating unit, the predetermined unit of the program read by the NC program reading unit and the variable value obtained from the variable value table;
   the character string for variable-check creating unit replaces a character string included in an instruction affected by the variable in the predetermined unit of the program with a character string for variable-check on the basis of the predetermined unit of the program read by the NC program reading unit and the variable value obtained from the variable value table input from the variable replacing unit; and
   the NC program for variable-check writing unit stores the replaced predetermined unit of the program in the NC program for variable-check storage region.

2. The numerical controller according to claim 1, wherein the NC program for variable-check is executable by the numerical controller and can be used to perform machining of work as can the NC program for execution.

3. The numerical controller according to claim 1, wherein the character string for variable-check includes a character string indicating the variable and a character string indicating a variable value assigned to the variable.

4. The numerical controller according to claim 2, wherein the character string for variable-check includes a character string indicating the variable and a character string indicating a variable value assigned to the variable.

* * * * *